Patented Aug. 13, 1940

2,211,592

UNITED STATES PATENT OFFICE 2,211,592

PEPTIZED VULCANIZATE AND METHOD OF PREPARING THE SAME

Allen D. Castello, Cuyahoga Falls, Ohio, assignor to The B. F. Goodrich Company, New York, N. Y., a corporation of New York No Drawing. Application January 22, 1938, Serial No. 186,468

14 Claims. (Cl. 260—711)

This invention relates to reclaimed rubber, and has as its principal object to provide a method whereby well-vulcanized rubber may be reclaimed by means of a peptizing agent.

The vulcanization of rubber appears to consist of a chemical reaction accompanied by changes of a colloidal nature. Heretofore, attempts to reclaim rubber have been directed mainly towards reversing the chemical reaction rather than the colloidal changes. While it is known that lightly vulcanized rubber gels can be peptized to form a product which can again be vulcanized, it has been believed that successful peptizing depends on treating the rubber during the early stage of vulcanization. It has not previously been known that rubber which has been vulcanized with an efficient accelerator to produce compositions of high tensile strength can be reversibly plasticized.

I have discovered that if well-vulcanized rubber is masticated in the presence of a peptizing agent without substantial heating, a reclaimed rubber capable of being re-cured to form vulcanizates having very high tensile strengths is produced. The vulcanized rubber which may be reclaimed by the method of this invention is the ordinary well-vulcanized soft rubber embodied in products having high tensile strengths such as rubber tires, inner tubes, mechanical goods, etc. They are usually ground, shredded, or otherwise comminuted before being subjected to the reclaiming process.

A wide variety of peptizing agents may be used in performing this invention. Organic materials which have the property of accelerating the vulcanization of rubber are all peptizing agents and the activity of the material as a peptizing agent seems to be directly proportional to its accelerating activity. Thus among the best peptizing agents are the mercaptothiazoles, dithiocarbamates, and their derivatives. Mercaptobenzothiazole, the zinc salt of mercaptobenzothiazole, the hexamethylene tetrammonium salt of mercaptobenzothiazole, the pyridinium salt of mercaptobenzothiazole, benzothiazyl disulfide, tetramethyl thiuram sulfide, tetramethyl thiuram disulfide, piperidinium pentamethylene dithiocarbamate, and diethylammonium diethyl dithiocarbamate are all very active peptizing agents for vulcanizates. Among other classes of compounds which are less active but which peptize vulcanizates to give good reclaims are included the guanidines, such as diphenyl guanidine, aldehyde-amines such as polybutylidene aniline, and hydrazines such as phenyl hydrazine.

One of the novel features of this invention resides in the fact that the mastication of the vulcanizate is performed without substantial heating. The mastication may be performed in an internal mixer, on a rubber mill, or by any other desired means, but in any case as the batch becomes substantially heated, the tendency of the vulcanizate to become peptized is reduced. Thus when the mastication is performed on a mill, the mill should be run cold or barely warm. When ground vulcanizate and a peptizing agent are masticated on a hot mill (about 180° F. or over) the tendency of the batch to knit and become homogeneous is either very slight or totally destroyed. There is no definite critical temperature at which the peptization stops, since the diminution in peptizing action depends somewhat upon the activity of the peptizing agent. In general, however, attempts to reclaim rubber upon a hot mill have been consistently unsatisfactory.

The peptizing agent is usually employed in small quantities, usually from 1% to 5% or over depending upon the particular materials used and the conditions employed. Since the mastication is performed at low or medium mill temperatures, softeners are usually included in the compositions upon the rolls. Rosin is a very satisfactory material, and other well-known softeners such as stearic acid, pine tar, and petrolatum may also be used. Since all the peptizing agents of this invention are accelerators of vulcanization, the peptized rubber need only be mixed with sulfur and cured to re-prepare a fully vulcanized rubber composition. The peptized material may be compounded in the same manner as other high quality reclaims, and usually produces vulcanizates having exceptionally high tensile strengths from four to ten times the strengths of vulcanizates made from the best grades of reclaimed rubber heretofore available.

Example I

As a specific example of this invention, 100 parts by weight of red inner tubes ground to pass a 10 mesh screen were masticated with 5 parts of rosin and 1 part of mercaptobenzothiazole upon a medium cold mill (about 100° F.). After a short time the rubber began to knit on the mill, and at the end of 20 minutes, a smooth, high-quality reclaim was obtained.

Example II

Red inner tubes ground to pass a 10 mesh screen 100 parts, rosin 5 parts, and the hexamethylene tetrammonium salt of mercaptobenzothiazole 1 part were masticated on a warm mill for 25 minutes. The resulting well-knit product was mixed with 2 parts of sulfur and cured in a press for 10 minutes at 287° F. The resulting vulcanizate had a tensile strength of 2975 lbs./sq. in. and an elongation of 510%. When 5 parts of gas black were added to the above sulfur-containing composition and the product was cured in a press for 7 minutes, a tensile strength of 3650 lbs./sq. in. was obtained.

*Example III*

In another embodiment of this invention, a good reclaim was prepared by masticating on a medium cold mill for 20 minutes 100 parts by weight of 10 mesh ground red inner tubes, 5 parts of rosin, 2 parts of stearic acid, and 1 part of mercaptobenzothiazole.

*Example IV*

When 100 parts of 10 mesh ground red inner tubes, 5 parts of rosin, 0.5 part of the hexamethylene tetrammonium salt of mercaptobenzothiazole, and 0.25 part of tetramethylthiuram disulfide were masticated on a cold mill for 16 minutes, a high quality reclaim which gave a tight, snappy cure when heated with sulfur was produced.

*Example V*

A mixture containing 10 mesh ground red tubes 100 parts, rosin 5 parts, and polybutylidene aniline 2 parts was masticated for 16 minutes on a cold mill. At the end of this time the reclaimed rubber was mixed with 3 parts of sulfur and cured in a press for 10 minutes at 287° F. The resulting vulcanizate had a tensile strength of 2440 lbs./sq. in. When the mixture of vulcanizate, rosin, and peptizing agent used above was placed on a cold mill, the batch began to knit in a short time. The mill was then heated, and the peptizing action became slower and slower until it stopped entirely. When the mixing was started upon a hot mill it was impossible to obtain a homogeneous composition even after long milling.

*Example VI*

A mixture containing 4 mesh ground grey tubes 100 parts, rosin 5 parts, and the zinc salt of mercaptobenzothiazole 2 parts was milled on a cold mill for 20 minutes. An excellent reclaim which produced good cures was obtained.

*Example VII*

A mixture containing 4 mesh ground grey tubes 100 parts, crude rubber (pale crepe) 2 parts, zinc oxide 2 parts, stearic acid 2 parts, and the hexamethylenetetrammonium salt of mercaptobenzothiazole was reclaimed on a mill, mixed with 1 part of sulfur, and cured in a press for 10 minutes at 287° F. The resulting vulcanizate had a tensile strength of 3650 lbs./sq. in.

*Example VIII*

In another embodiment, a mixture containing 10 mesh ground red tubes 100 parts, rosin 5 parts, and diphenyl guanidine 1 part was milled on a medium-cold mill for 20 minutes to produce a satisfactory reclaimed rubber.

Although I have herein disclosed specific embodiments of my invention, it is not limited thereto, for it will be obvious that many modifications such as substituting equivalent materials and varying the amounts of materials used are within the spirit and scope of the invention as defined in the appended claims.

I claim:

1. The method of reclaiming well-vulcanized soft rubber which comprises adding an organic material which has the property of accelerating the vulcanization of rubber to the comminuted vulcanizate and masticating the mixture at a temperature below 180 F. until the comminuted particles knit and cohere to form reclaimed rubber, the whole reclaiming process from the addition of the accelerator to the formation of reclaimed rubber being performed at a temperature below 180 F.

2. The method of claim 1 in which the mastication is performed at about 100° F.

3. The method of claim 1 in which the mastication is performed in the presence of a softener at about 100° F.

4. The method of claim 1 in which the mastication is performed in the presence of a mercaptothiazole.

5. The method of claim 1 in which the mastication is performed in the presence of the hexamethylene tetrammonium salt of mercaptobenzothiazole and a softener.

6. The method of claim 1 in which the mastication is performed in the presence of an aldehyde-amine peptizing agent at about 100 F.

7. The method of claim 1 in which the mastication is performed in the presence of polybutylidene-aniline and a softener at about 100 F.

8. A peptized vulcanizate obtained by the method of claim 1.

9. A peptized vulcanizate obtained by the method of claim 1 in which the mastication is performed at about 100 F.

10. A peptized vulcanizate obtained by the method of claim 1 in which the mastication is performed in the presence of a softener at about 100° F.

11. A peptized vulcanizate obtained by the method of claim 1 in which the mastication is performed in the presence of mercaptobenzothiazole and a softener.

12. A peptized vulcanizate obtained by the method of claim 1 in which the mastication is performed in the presence of the hexamethylene-tetrammonium salt of mercaptobenzothiazole and a softener.

13. A peptized vulcanizate obtained by the method of claim 1 in which the mastication is performed in the presence of an aldehyde-amine peptizing agent at about 100° F.

14. A peptized vulcanizate obtained by the method of claim 1 in which the mastication is performed in the presence of polybutylidene-aniline and a softener at about 100 F.

ALLEN D. CASTELLO.